US012772958B1

(12) United States Patent
Beckel et al.

(10) Patent No.: US 12,772,958 B1
(45) Date of Patent: Oct. 27, 2026

(54) CALF FEEDING SYSTEM

(71) Applicant: GOLDEN CALF COMPANY LLC, Bloomer, WI (US)

(72) Inventors: Andrew Beckel, Bloomer, WI (US); Dagmar Beckel Machyckova, Bloomer, WI (US)

(73) Assignee: GOLDEN CALF COMPANY LLC, Bloomer, WI (US)

( * ) Notice: Subject to any disclaimer, the term of this patent is extended or adjusted under 35 U.S.C. 154(b) by 715 days.

(21) Appl. No.: 18/132,720

(22) Filed: Apr. 10, 2023

Related U.S. Application Data

(60) Provisional application No. 63/329,404, filed on Apr. 9, 2022.

(51) Int. Cl.
*A01K 9/00* (2006.01)
*B65D 75/58* (2006.01)
*B65D 85/80* (2006.01)

(52) U.S. Cl.
CPC ............ *A01K 9/00* (2013.01); *B65D 75/5883* (2013.01); *B65D 85/80* (2013.01)

(58) Field of Classification Search
CPC ... A01K 9/00; A01K 9/05; A01K 7/06; B65D 75/5883; B65D 85/80; B65D 75/5877; B65D 7/26; B65D 41/50; A61J 9/005
See application file for complete search history.

(56) References Cited

U.S. PATENT DOCUMENTS 2,190,420 A 2/1940 Frederick et al.
2,329,347 A * 9/1943 Graham ................. A01K 9/005 119/71
2,708,421 A * 5/1955 Jauch ...................... A61J 9/005 215/11.4
D227,182 S 6/1973 Shiber
3,958,535 A * 5/1976 Salvia ...................... A01K 7/06 119/71

(Continued)

OTHER PUBLICATIONS

"Baby Bird Feeding Syringe" available Jan. 6, 2021, [online], [site visited May 8, 2025]. Retrieved from Internet, URL: https://www.amazon.com/ Feeding-Syringe-Parrot-Curved-Stainless/dp/B08S78PWC8/ref=sr_1_4_sspa (Year: 2021).

(Continued)

*Primary Examiner* — Vishal Pancholi
(74) *Attorney, Agent, or Firm* — Christensen, Fonder, Dardi & Busse PLLC.; Andrew H. Auderieth; Douglas J. Christensen

(57) ABSTRACT

A single use colostrum feeding system includes a polymer feeding tube that non-removably is installed in the fitment of a colostrum feeding bag. The feeding tube has an annular barb that snaps into the fitment and cannot be removed without damaging the fitment and feeding tube such that reuse is effectively precluded. A series of circumferential ribs extending around the tubular portion provide a kinking positioning feature may also be utilized for connecting a flexible hose to the tubular feeder, expanding the length and allowing variable positioning of the feeding bag with respect to the calf being fed. The feeding tube may be cut in the middle of the series of ribs and then each end of a piece of tubing may be press fit over the ribs on each respected piece of the bifurcated tubing feeder.

20 Claims, 7 Drawing Sheets

(56) References Cited

U.S. PATENT DOCUMENTS

| | | | | |
|---|---|---|---|---|
| 4,634,425 | A | 1/1987 | Meer | |
| 4,698,059 | A | 10/1987 | Johnson | |
| 5,334,167 | A | 8/1994 | Cocanower | |
| 5,868,705 | A | 2/1999 | Bagaoisan | |
| 8,336,495 | B1 | 12/2012 | Dumm | |
| 8,490,577 | B1 | 7/2013 | Dumm | |
| 9,775,365 | B2 | 10/2017 | Pedersen | |
| 11,572,224 | B2 * | 2/2023 | Ruschmeier | B65D 51/002 |
| 2004/0104246 | A1 * | 6/2004 | Kawaguchi | B65D 5/746 222/83 |
| 2008/0029540 | A1 * | 2/2008 | Johnson | B65D 75/5877 222/83 |
| 2009/0093794 | A1 | 4/2009 | Holtz | |
| 2015/0231037 | A1 | 8/2015 | Munson | |

OTHER PUBLICATIONS

"Calf Fluid Feeder" available 2014, [online], [site visited May 8, 2025]. Retrieved from Internet, URL: https://www.farmandfleet.com/ products/562031-coburn-calf-fluid-feeder.html (Year: 2014).

"Calf Hero Snap-In Tube Feeders by Golden Calf Co-long explanation" available Apr. 26, 2021, [online], [site visited May 9, 2025]. Retrieved from Internet, URL:https://www.youtube.com/watch?V=VYKD30kvOPc&list=PLOINiNp594AxKOqp65D9bbE_CcPLHp9&index=1 ( Year: 2021).

"Feed Tube N"“available May 8, 2025, [online], [site visited May 8, 2025]. Retrieved from Internet, URL: https://dairytechinc.com/store/feedtube-nl (Year: 2025)".

"JorVet Oral Calf Drencher" available Aug. 8, 2006, [online], [site visited May 8, 2025]. Retrieved from Internet, URL: https://www.amazon.com/ JorVet-J0138-Oral-Calf-Drencher/dp/B000HHQ1RW/ref=sr_1_6 (Year: 2006).

"Springer Magrath Calf Tube Feeder" available Feb. 13, 2021, [online], [site visited May 8, 2025]. Retrieved from Internet, URL: https://www.amazon.com/Feeder-Esophageal-Plastic-Magrath-Gallon/dp/B075MYT1M7/ref=sr _1_1_sspa (Year: 2021).

* cited by examiner

CALF FEEDING SYSTEM

RELATED APPLICATIONS

This application claims priority to U.S. Provisional Application No. 63/329,404 filed on Apr. 9, 2022, and further claims priority to U.S. Design patent application Ser. No. 29/834,101 filed on Apr. 9, 2022. Said applications are incorporated herein by reference.

BACKGROUND OF THE INVENTION

In the dairy industry, proper and optimal care of newborn calves, including feeding, has been proven to be directly related to the productivity of the cows as later milk producers. The feeding requires proper amounts of and timing of feeding colostrum. Great care needs to be taken to prevent bacteria or other contamination of the colostrum and feeding implements utilized to keep the calves healthy. Reuse of polymer feeding tubes is problematic as they do not clean adequately for reuse. Similarly, best practices allow only single use of polymer colostrum bags. A system for preventing reuse of feeding tubes and colostrum bags would be beneficial to the dairy industry, minimizing contamination of the feeding tubes and colostrum.

SUMMARY OF THE INVENTION

A single use colostrum feeding system includes a polymer feeding tube that non-removably is installed in the fitment of a colostrum feeding bag. The feeding tube is unitarily molded and has a bag insertion end with a annular tapered lead-in portion having an annular barb portion, the lead in portion is inserted into a cooperating fitment on a colostrum bag. The annular barb portion snaps into the fitment and seats on an internal shoulder and is captured therein so that it cannot be removed without damaging the fitment and feeding tube such that reuse is effectively precluded. In embodiments, the feeding tube is formed of polyethylene and has some flexibility, sufficient that it can be kinked to prevent fluid flow therein if desired. The feeding tube has a bulbous portion forward of the annular barb, that is tightly received in a neck of the bag fitment effectively precluding any movement of the insertion end other than the axial insertion of the insertion end into the fitment. The feeding tube has a conical portion that connects to the bulbous portion and diverges outwardly providing an engagement surface for the distal edge of the fitment neck. The fitment neck has a length that allows the snap-in insertion of the annular barb and then by engagement of the fitment neck with the diverging conical portion provides tension that maintains a sealing engagement between the annular lip and the fitment shoulder. The diverging conical portion connects to the converging conical portion that extends to a mid tubular portion, the mid tubular portion extends to a bulbous end portion that is inserted into the calf's esophagus.

In embodiments, a series of circumferential ribs extend around the tubular portion separated from the converging conical portion. These ribs provide a kinking positioning feature such that if a user desires to kink the tube to inhibit flow, the ribs localize the kinking to the location on the tube at the ribbing. The series of circumferential ribs may also be utilized for connecting a flexible hose to the tubular feeder, expanding the length and allowing variable positioning of the feeding bag with respect to the calf being fed. The feeding tube may be cut in the middle of the series of ribs and then each end of a piece of tubing may be press fit over the ribs on each respected piece of the bifurcated tubing feeder, the ribs providing a retention and sealing between the piece of tubing and the respective tubing feeder pieces.

DETAILED DESCRIPTION

Figure 1A:
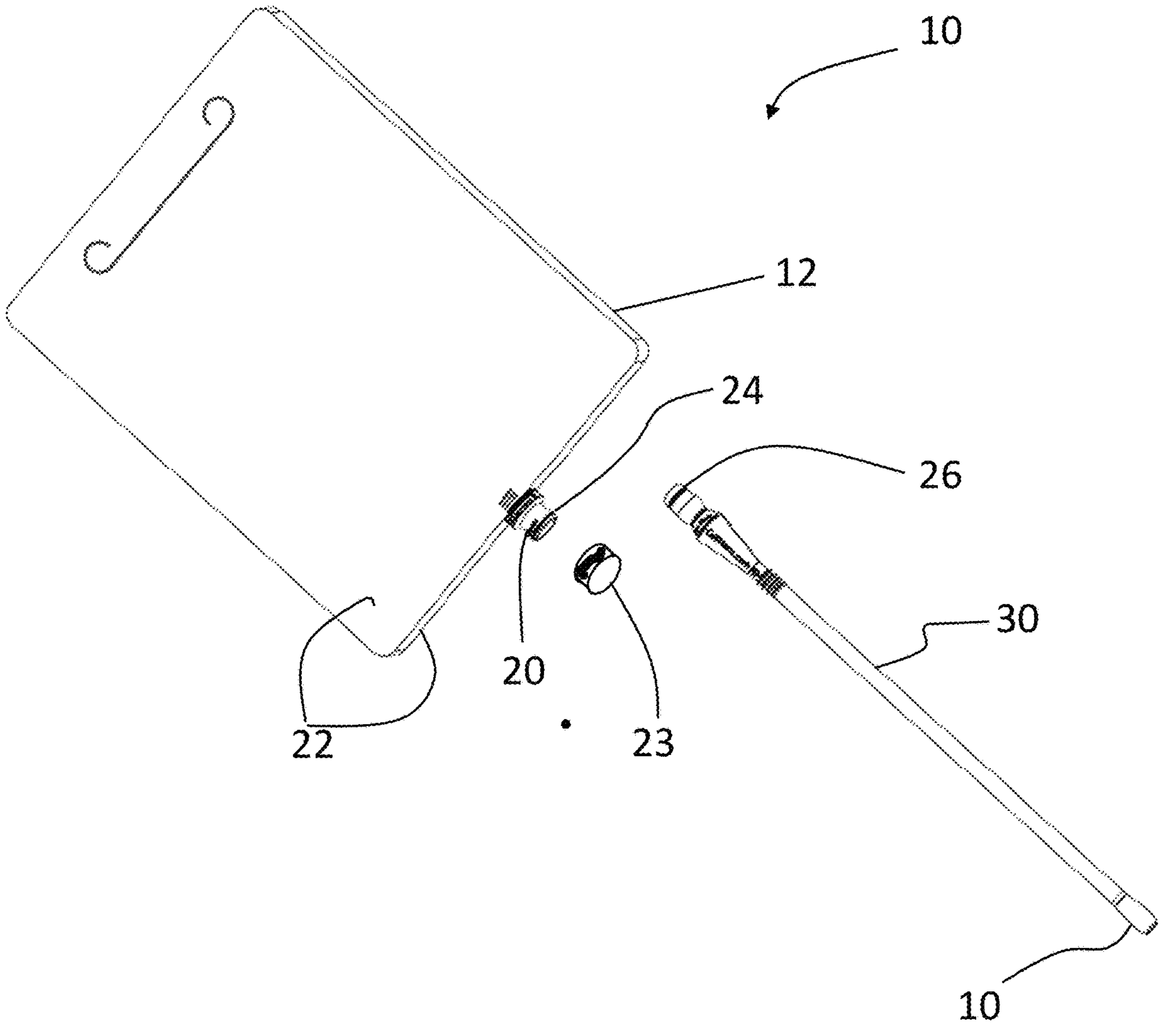
FIG. 1A is a perspective view of a calf feeding system comprising a colostrum bag and a single use feeding tube in accord with embodiments.
Figure 1B:
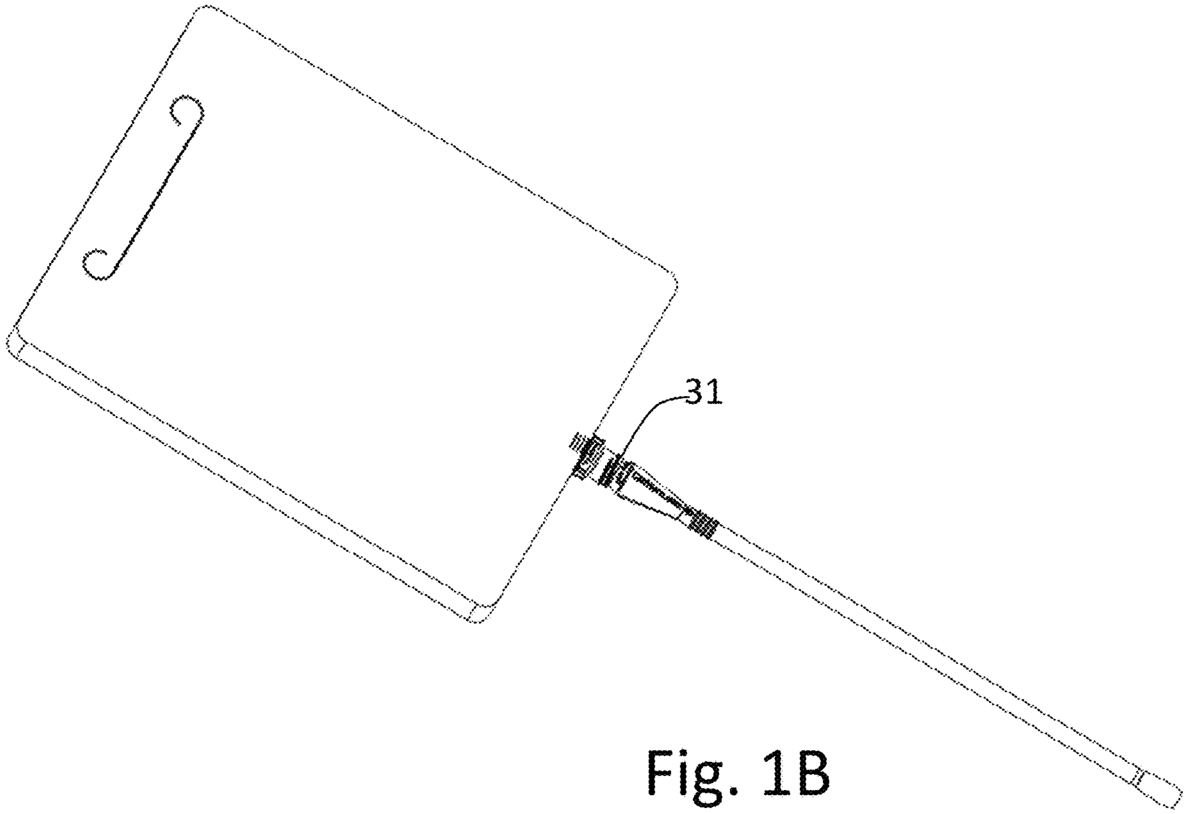
FIG. 1B is a perspective view of a colostrum bag connected to a single use feeding tube in accord with embodiments.
Figure 2:
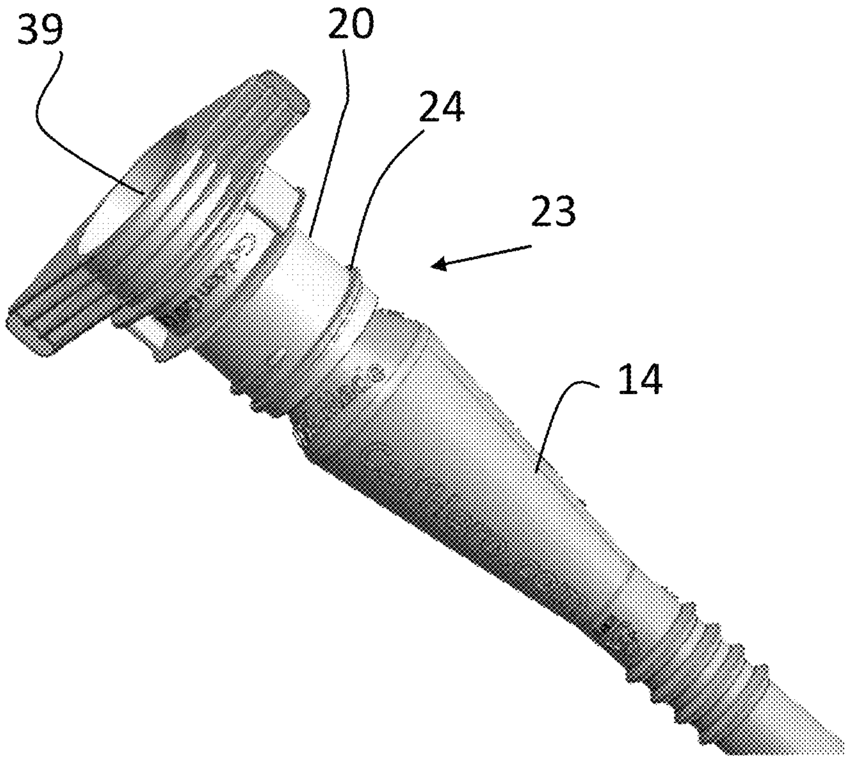
FIG. 2 is an enlarged perspective view of the connection of the colostrum bag fitment, with the bag not shown, to the connecting end of the feeding tube.
Figure 3:
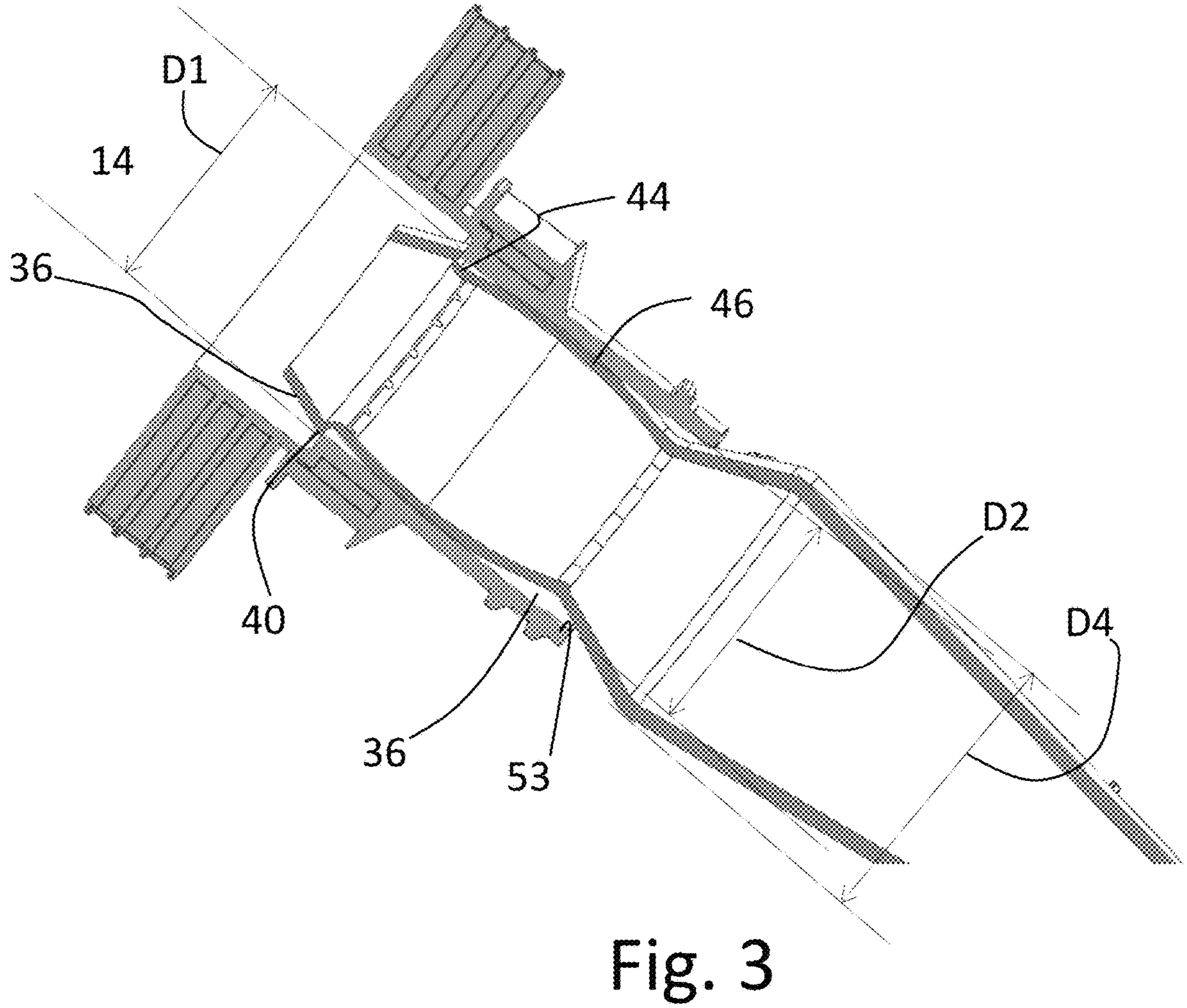
FIG. 3 is a cross sectional view of the fitment and connecting end of the feeding tube.
Figure 4:
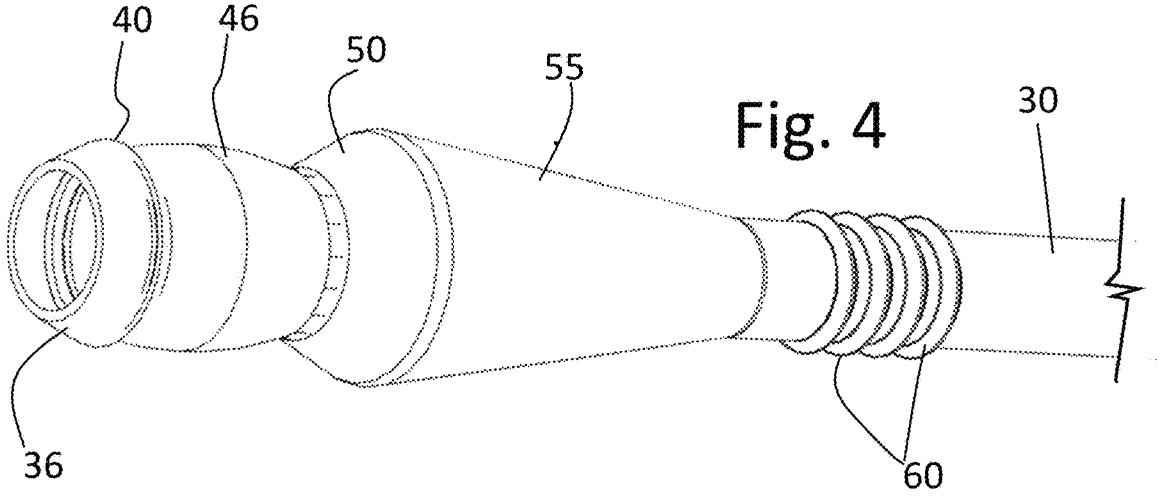
FIG. 4 is an enlarged perspective view of the bag attachment end of the feeding tube.
Figure 5:
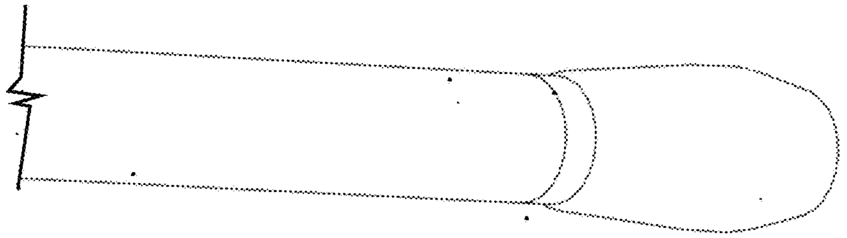
FIG. 5 is an enlarged perspective view of the feeding end of the feeding tube.
Figure 6:
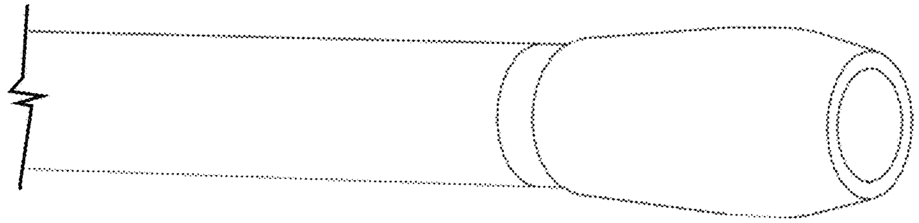
FIG. 6 is another enlarged perspective view of the feeding end of the feeding tube.
Figure 7:
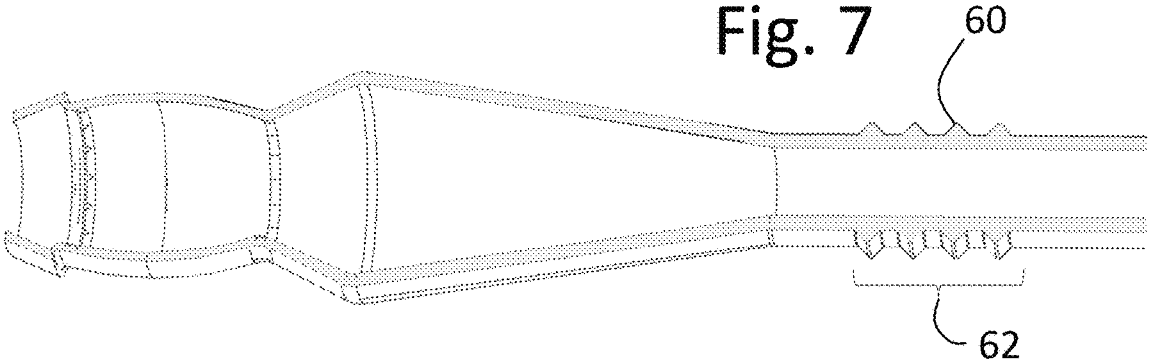
FIG. 7 is a cross sectional view of a colostrum bag connecting end of the calf feeding tube.
Figure 8:
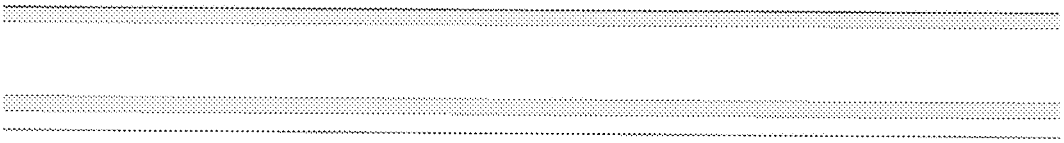
FIG. 8 is cross sectional view of the mid portion of the feeding tube.
Figure 9:
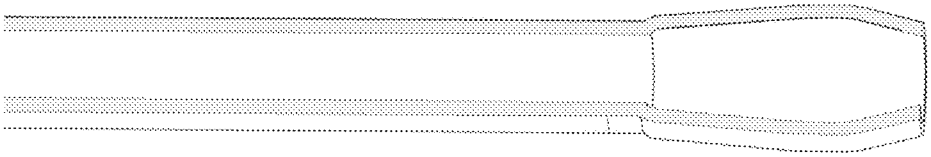
FIG. 9 is a cross sectional view of the feeding end of the calf feeding tube.

Referring to FIGS. 1A and 1B, a calf colostrum feeding system 10 is depicted and generally comprises a flexible polymer bag 12 for holding colostrum, and a polymer feeding tube 14. The polymer bag has a fitment 20 that is bonded to the bag walls 22 and a cap 23. The cap having internal threads that cooperate with the external threads 24 of the fitment for closing the bag. The feeding tube 14 has a connection end 26, an opposite feeding end 28, and an intermediate tubing portion 30. The connection end is inserted into and connects to the fitment as shown in FIGS. 1B-3 forming the connection 31.

Referring to FIGS. 3-7, the connection end has a forward tapered lead-in portion 36 that is configured as a cone and defining an annular barb portion 40 at the lower margin. The maximum diameter of the barb D1 is slightly greater than the internal diameter D2 of the fitment passageway 39 such that upon pressing the annular barb of the connection end past the shoulder 42, the sharp corner of the barb is captured by the shoulder 42 and cannot be pulled out of the connection without damaging the connection end and/or the fitment 20. The forward lead in portion is radially compressible, facilitated by the narrowed reduced diameter portion 44 that is part of a bulbous portion 46. The bulbous portion 46 connects to a diverging conical portion 50 that has a maximum diameter D4 that is greater that the inside diameter D2 of the entryway 53 of the passageway 39. A converging conical portion 55 connects to the diverging conical portion 50 that then connects to the constant diameter intermediate tubular portion 30 that then connects to the bulbous feeding end 28.

Figure 10:
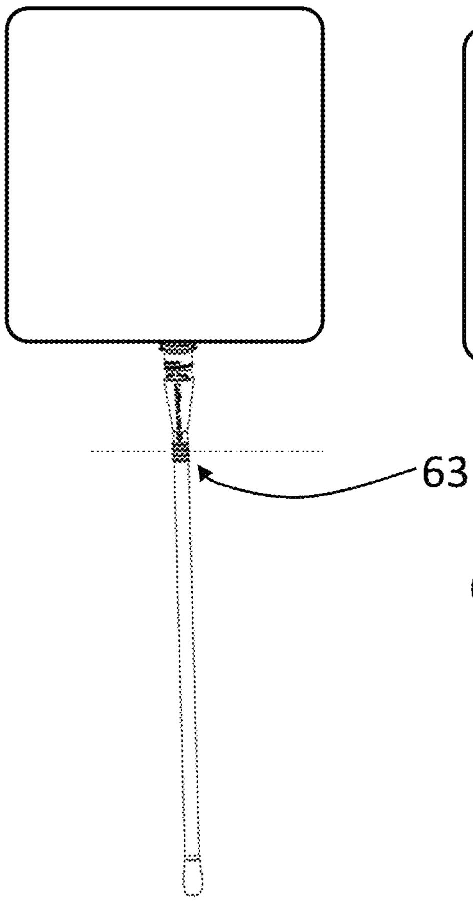
FIG. 10 is an elevational view of the single use feeding system.
Figure 11:
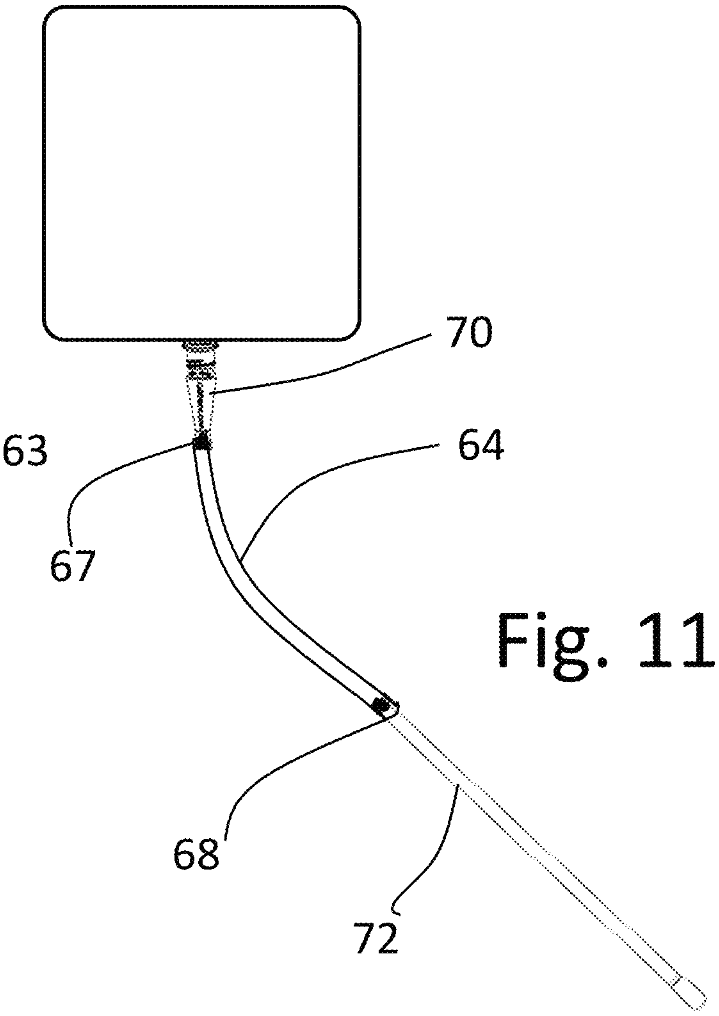
FIG. 11 is an elevational view of the single use feeding system with a flexible hose connected to the bifurcated feeding tube.

On the constant diameter intermediate tubular portion 30 are a plurality of ribs 60 that extend circumferentially about the tubular portion. The ribs providing a kink facilitation portion 62 within the cluster 63 of ribs. This region may be configured as a billows. Further, the feeding tube 14 can be cut into two pieces within the rib cluster 63 such as shown in FIG. 10 to bifurcate the feeding tube and then a flexible hose 64 may be attached to the respective new internal ends 67, 68 of the connection piece 70 and the feeding piece 72. This provides flexibility in positioning or elevating the bag 12 during the calf feeding process.

The feeding tube may be blow molded or formed from other molding techniques and is suitable formed from polyethylene, for example high density polyethylene, or low density polyethylene or mixtures of the two.

The following patents are incorporated herein by reference for all purposes: U.S. Pat. Nos. 9,775,365; 8,490,577; 8,336,495; and 2,190,420. The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

We claim:

1. A calf feeding system comprising a bag with flexible walls defining an interior and a fitment, the fitment having a bag joinder portion, a neck portion with a fluid pathway, the neck portion having an internal shoulder, the feeding system further comprising a polymer feeding tube having a bag connection end and an opposing feeding end, the bag connection end of the polymer feeding tube having a lip end sized for sealing and a retention fit on the internal shoulder of the neck portion and a conical diverging portion diverging to a diameter greater than an internal diameter of the neck portion defining the fluid pathway, such that when the lip is in contact with the internal shoulder of the neck portion, the conical diverging portion is in contact with an open end of the neck portion thereby locking the polymer feed tube in place with respect to the fitment and preventing the polymer feeding tube from moving distally or proximally.

2. The calf feeding system of claim 1, wherein the polymer feeding tube has a bulbous portion next to the lip.

3. The calf feeding system of claim 2, wherein the lip is configured as an annular barb.

4. The calf feeding system of claim 2, wherein the bulbous portion seats entirely within the neck portion of the fitment when the polymer feeding tube is connected to the fitment.

5. The calf feeding system of claim 4, wherein a conical diverging portion is next to the bulbous portion.

6. The calf feeding system of claim 5, wherein the polymer feeding tube has a converging portion next to the conical diverging portion, the converging portion extending to an intermediate tubular portion with a constant internal diameter.

7. The calf feeding system of claim 1, wherein the lip is configured as an annular barb.

8. The calf feeding system of claim 1, wherein the polymer feeding tube has a plurality of circumferential ribs on the intermediate tubular portion between the converging portion and the feeding end.

9. The calf feeding system of claim 8, further comprising a tube sized to fit on the intermediate tubular portion when bifurcated at the intermediate tubular portion where the plurality of circumferential ribs are located.

10. The calf feeding system of claim 1, wherein when the polymer feeding tube is connected to the fitment of the bag, the tubing is locked therein and cannot be readily removed without damaging the feeding tube and/or fitment.

11. A polymer calf feeding tube having a bag connection end and an opposing feeding end, the bag connection end having an annular barbed end, the annular barbed end comprising a bulbous portion having a contoured profile with a wide central portion, the wide central portion being sized for sealing and retention with a fitment, a conical diverging portion adjacent the bulbous portion, the conical diverging portion diverging to a diameter greater than an internal diameter of a neck portion of the fitment, and an intermediate tubing portion extending between the feeding end and the bag connection end.

12. The polymer calf feeding tube of claim 11, wherein the intermediate tubing portion has a plurality of ribs extending circumferentially around the tubing portion.

13. The polymer calf feeding tube of claim 12, wherein the tubing diameter is greater than 0.375 inches.

14. The polymer calf feeding tube of claim 12, wherein the tubing diameter is less than 0.75 inches.

15. The polymer calf feeding tube of claim 12, wherein the tubing diameter is greater than 0.50 inches.

16. The polymer calf feeding tube of claim 12, wherein the tubing diameter is less than 0.90 inches.

17. The polymer calf feeding tube of claim 12, wherein there are at least three ribs and the ribs are in a cluster extending an axial length of from 0.30 inches to 1.25 inches.

18. A polymer calf feeding tube having a bag connection end and an opposing feeding end, the bag connection end having an annular barbed end sized for sealing and retention with a fitment, an intermediate tubing portion extending between the feeding end and the bag connection end, and wherein the intermediate portion having a billows portion therein facilitating bending of the feeding portion.

19. The polymer calf feeding tube of claim 18 wherein the bag connection end has a lead-in portion with an annular barbed portion to snap-in to a non-removable without damage connection with a fitment on a feeding bag.

20. A method of feeding a calf with a single use polymer calf feeding tube of claim 18, the method comprising:

inserting the annular barbed end of the polymer calf feeding tube into a fitment on a bag with flexible walls defining an interior, the fitment having a bag joinder portion, a neck portion with a fluid pathway, the neck portion having an internal shoulder; and positioning the barbed end past the internal shoulder latching the barbed end thereon such that the polymer calf feeding tube cannot be removed without damage to the polymer calf feeding tube and/or the fitment thereby providing a single use feeding tube.

* * * * *